QUATERNARY DIFFERENTIAL PHASE-SHIFT SYSTEM USING ONLY THREE PHASE-SHIFT VALUES AND ONE TIME-SHIFT VALUE

Filed May 12, 1965 2 Sheets-Sheet 1

INVENTORS
PIERRE BIZET
JACQUES OSWALD
BY Paul M. Craig, Jr.
ATTORNEY

INVENTORS
PIERRE BIZET
JACQUES OSWALD
BY Paul M. Craig, Jr.
ATTORNEY

United States Patent Office
3,412,206
Patented Nov. 19, 1968

3,412,206

QUATERNARY DIFFERENTIAL PHASE-SHIFT SYSTEM USING ONLY THREE PHASE-SHIFT VALUES AND ONE TIME-SHIFT VALUE

Pierre Bizet, 4 Rue Antoine Petit, Fontenay-aux-Roses, Hauts-de-Seine, France, and Jacques Oswald, 1 Rue Salomon de Brosse, Versailles, Yvelines, France Filed May 12, 1965, Ser. No. 455,183
Claims priority, application France, May 12, 1964, 974,213
9 Claims. (Cl. 178—67)

ABSTRACT OF THE DISCLOSURE

A modulator and demodulator are shown for a quaternary differential phase-shift system, wherein three of four possible pulse pair combinations are represented by three different phase shift values, respectively, each shift occurring at a given instant after the second pulse of the pair, and wherein the fourth possible pair combination produces no phase change at the given instant, but produces a phase shift one pulse time later, the magnitude of which phase shift is determined by the condition of the pulse immediately following the pair.

This invention relates to a new class of high speed rhythmic telegraph systems based on differential phase modulation, that is to communication systems in which transmission of binary coded signals of constant duration is effected by suddenly changing at periodically recurring instants the phase of a carrier wave.

To simplify the language, the coded signals to be transmitted will be hereinafter referred to as "telegraph signals," although they might as well represent coded digital data or the like.

The invention relates more particularly to a process and an arrangement for three-phase differential phase telegraph modulation, as well as to a corresponding demodulator, operating on three phase jump or shift values: for instance 0, $\pi$, $\pi/2$ radians.

Differential phase binary telegraph modulation systems are known in which, out of two telegraph values (signalling conditions) called A and Z designated in accordance with the ratation recommended by the International Telephone and Telegraph Committee, the value "A" is expressed, for instance, by a phase jump or shift $\Delta\phi$ equal to $\pi$ radians, i.e., 180 degrees while the value "Z" is expressed by a zero phase jump.

Differential phase quadrivalent telegraph modulation systems are also known in which successive elementary signals are considered in pairs, or "doublets," (also called "dibits"), referred to conventionally by UV, and where a different and given phase jump or shift 0, $\pi/2$, $\pi$, $3\pi/2$ radians corresponds to each of the four possible pairs, for instance:

| UV: | $\Delta\phi$ |
|---|---|
| ZZ | 0 |
| ZA | $\pi/2$ |
| AA | $\pi$ |
| AZ | $3\pi/2$ |

A constant duration T then corresponds to a complete pair, "UV." Different phase binary and quadrivalent telegraph modulation systems are disclosed, for example, in the U.S. patent application Ser. No. 454,048 for "High speed telegraph receivers for phase or frequency keyed waves," filed May 7, 1965, in the name of Jacques Oswald.

In the known systems it was necessary, for transmitting elementary signal pairs consisting of anyone of the four different permutation combinations of the symbols A and Z, to use four different phase jump values. An object of the present invention is to make it possible to obtain the same result with three phase jump values only, this in view of reducing the cost of the receiving equipment which, if a high degree of reliability and protection against errors likely to be caused by disturbances and distortion in the transmission channel is desired, is all the more complicated and expensive that a larger number of phases are employed. It will be shown later on how this has been made possible by causing the phase jumps to occur at well defined instants, two successive of which, contrarily to the practice followed in the previously known systems, are no longer always separated by a time interval T equal to the duration of a signal pair (or to an integer multiple thereof) but are, for certain signal combinations, separated by a time interval equal to an odd integer multiple of $T/2$ at least equal to $3T/2$.

Another advantage of the method which uses three distinct phase jump values instead of four is that it makes it possible to employ larger phase jumps allowing, at the end/receiving of the transmission system, easier discrimination between the corresponding signalling conditions.

It is also one object of the invention to provide differential phase jump telegraph modulation process of the three-phase type in which pairs of binary signals, each element of which may have one or the other of the A and Z signalling conditions, produce different phase changes in a carrier wave according to the following rules:

(a) The signals to be transmitted are individually sampled for their signalling condition (A or Z) at recurring instants separated by a constant time interval equal to half the duration T of such a pair; thereafter (b) A ZZ pair produces no phase change (c) An AZ pair produces a $\pi/2$ radian phase change at a given instant following the sampling instant for the second signal of the pair by a further constant time interval;

(d) An AA pair produces a $\pi$ radian phase change at the same instant when an AZ pair would produce a $\pi/2$ phase change;

(e) Finally, a ZA pair produces no phase change at the latter said instant, but a phase change occurs at a later instant, delayed by $T/2$ with respect to the former, the magnitude of this phase change depending on the signalling condition of the signal which immediately follows the ZA pair: a $\pi/2$ change occurs if the latter signal is a Z, or a $\pi$ change if it is an A.

Of course the rules (a) to (e) are not rigid ones. For instance, the values $\pi/2$ and $\pi$ are selected by way of example only, and might be replaced by different ones. Similarly, different correspondence rules might be adopted between the permutation combinations of the signals A and Z and the phase changes. However, the particular arrangement specified above in (b) to (d) will be retained, for simplicity and convenience, in the following description.

Another object of the invention is to provide an arrangement for the embodiment of said modulation process. The invention also relates to a demodulation process for a differential phase jump modulated wave of the type mentioned above as well as to a corresponding demodulator arrangement.

These and other objects, features and advantages of the present invention will become more obvious from the following description when taken in connection with the accompanying drawing which shows, for purposes of illustration only, one embodiment in accordance with the present invention, and wherein.

As already mentioned, in the system of the present invention, modulation is a function of signal in pairs, in a similar manner to the case of quadrivalent modulation, but only three pair equivalences need to be defined, for instance:

| | |
|---|---|
| ZZ | 0 |
| AZ | $\pi/2$ |
| AA | $\pi$ |

(All angles being expressed in radians.)

As in the binary and quadrivalent systems referred to above, a constant duration T corresponds to a complete pair.

The appearance of a Z following any pair results in no phase change, the corresponding phase jump $\Delta\phi$ being 0. If a pair ZZ occurs, after any pair, there is no phase jump for duration T equal to that of a signal pair. If there appears a Z followed by an A, the sequential organization of the pairs of duration T is broken: the phase is preserved for a period half as long, i.e. equal to $T/2$, and a pair arrangement is resumed with the next following pair beginning with an A, which is AZ or AA as the case may be.

For instance, the following table is obtained:

| Pair | $\Delta\phi$S | $\Delta$t |
|---|---|---|
| ZZ | 0 | T |
| AZ | $\pi/2$ | T |
| AA | $\pi$ | T |
| Z(A . . .) | 0 | T/2 |

where $\Delta t$ designates the time interval after which a phase change takes place, measured from some common origin in the duration of the pair.

On the last line, A has been bracketed for indicating that there has been a break in the sequence of organization of the pairs.

Contrarily to the case of quadrivalent modulation, where four are provided by four different phase jumps (including the zero phase jump), the present invention provides for replacement of one of the phase jump values by a time shift of the instant where the phase jump takes place, three data being provided by three values of the phase jump and a fourth one by said time shift.

The phase quadrature indicated at the second line of the just-given correspondence table may be taken either as $\pi/2$ or as $3\pi/2$. It is even possible, in a given system, to switch systematically from one value to the other for symmetry reasons, these two phase jumps being given the same logical value.

The invention will now be described in greater detail with reference to the accompanying drawings.

Figure 1:
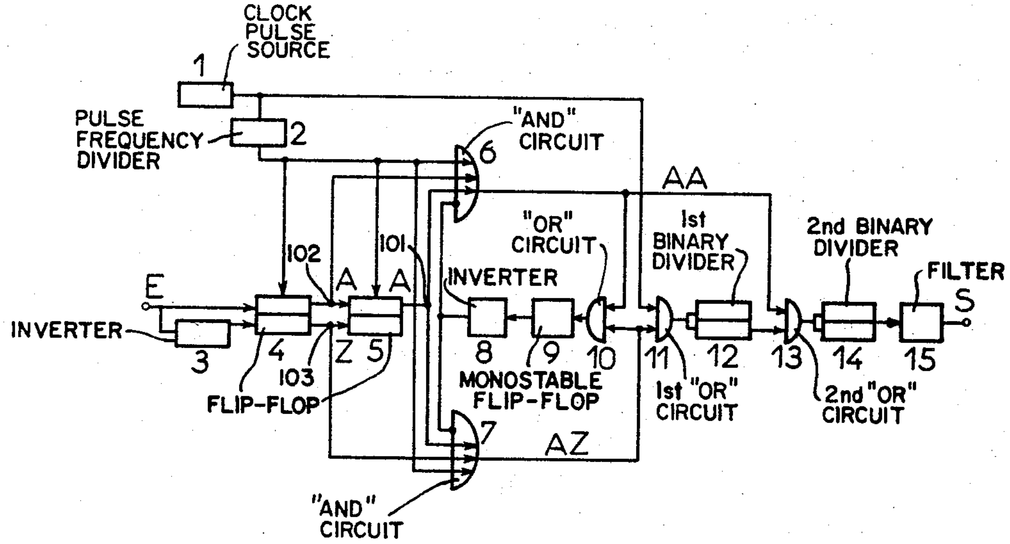
FIGURE 1 shows an embodiment of a modulator in accordance with the invention.

In FIGURE 1 showing a modulator in accordance with the invention, 1 is a clock pulse source generating short pulses with the frequency $$f_1=\frac{6}{T}$$

T being the duration corresponding to the transmission of an elementary signal pair. These pulses are fed to one of the inputs of the "OR" circuit 11, the output of which is fed to the binary divider flip-flop 12, the output of which is fed to one of the inputs of the "OR" circuit 13, the output of which is fed to the input of a further binary divider flip-flop 14. The output of 14 is fed to the input of a band-pass filter 15. From the output of 15, the phase-modulated carrier with a frequency $3/2T$ is delivered at point S. The operation of binary dividers such as 12 and 14 is explained in the book by J. Millman and H. Taub, entitled "Pulse and Digital Circuits," edited by McGraw-Hill Book Co., New York, 1956, page 323 and FIGURE 11-1.

The relationships between the frequency $f_1$, the carrier wave frequency and the duration T are selected by way of example, the only necessary conditions being that $f_1$ be an integer multiple of $1/T$, that the carrier wave frequency be an integer multiple of $1/2T$ and that $f_1$ be an integer multiple of said carrier wave frequency.

The binary signals providing the modulation are fed into the system at terminal E connected directly to the first signal input of a flip-flop 4 and through the inverter 3 to its second signal input; said flip-flop is provided with two outputs and a control input the function of which is to render said flip-flop operative at certain instants only by means of control pulses applied to said control input. The outputs of 4 are respectively connected to the signal inputs of a similar flip-flop 5. The assembly 3, 4, 5 is provided for performing a series-parallel conversion on the telegraph modulation. In other words, the purpose of the assembly 3, 4, 5 is that of generating, for each signal pair sequentially applied at point E, a corresponding pair of control signals, simultaneously appearing at a pair of corresponding points of the system. Each of the latter said control signals appears at a different point, according to the signalling condition of the element of an original signal pair it represents, and the two points of said point pair also differ according to the arrangement of said signalling conditions in said original signal pair. Thus, in FIGURE 1:

An AA pair causes control signals to simultaneously appear at points 101 and 102.

An AZ pair causes control signals to simultaneously appear at points 101 and 103.

A ZZ pair or a ZA pair causes a control signal to appear at point 103 or point 102 only (the other output of 5, which would constitute the point corresponding to the first element of a ZZ or a ZA pair, is not used).

A frequency divider 2 fed from the clock pulse source 1 supplies short control pulses with a frequency $$f_2=\frac{2}{T}$$

These pulses are fed to the control inputs of the flip-flops 4 and 5 as well as to one of the inputs of the two "AND" circuits 6 and 7 each provided with three signal inputs, at all of which signals must be simultaneously present to bring the circuit to its passing condition. The phases of the pulses of frequencies $f_1$ and $f_2$, respectively delivered by 1 and 2, are so arranged that no two of said pulses coincide in time.

The arrangement of the flip-flops 4 and 5 is such that the A signals appear at one output of 4 and also at one output of 5, while the Z signals appear at the other output of 4 only. The second output of 5 is not used.

The "AND" circuit 6 provided with several inputs, is supplied at two respective of latter said inputs with two control signals, one coming from the flip-flop 4 and the other from the flip-flop 5. The "AND" circuit 7 is similarly supplied with a Z control signal coming from the flip-flop 4 and a control signal coming from the flip-flop 5. The output of the "AND" circuit 6 is fed to one of the inputs of the "OR" circuit 13 and the output of 7 is fed to one of the inputs of the "OR" circuit 11.

Each one of the "AND" circuits 6 and 7 is further provided with an "INHIBIT" input indicated by a dot. These latter inputs are supplied through the inverter 8, by the output of a monostable flip-flop 9, if necessary the duration of the signals delivered by which is slightly larger than $T/2$. This flip-flop receives, through the "OR" circuit 10, the output signals of the "AND" circuits 6 and 7.

For an endless ZZ series, one obtains a carrier free of phase changes, which features three half-waves per elementary signal of duration T since none of the "AND" circuits 6 and 7 receives at its three inputs the three simultaneous control signals necessary to bring it to its passing condition. Consequently, no signal reaches the control inputs of the "OR" circuits 11 and 13 (i.e. their lower and upper input, respectively in FIGURE 1). The latter circuits constantly remain in their passing condition, and a non-modulated wave with a frequency equal to one-fourth of that of the pulses delivered by source 1 is received at the output of 14 and at point S.

It will now be shown that, in the arrangement of FIGURE 1, an AA pair causes a phase jump of $\pi$ radians, and that an AZ pair causes a phase jump of $\pi/2$ radians.

In the first case, control signals from points 101 and 102 are applied to the corresponding inputs of 6, while circuit 7 is maintained in its non-passing condition by the absence of any signal at point 103. When a pulse is delivered by the frequency divider 2, a signal is transmitted to the control input of 13 by the connection marked "AA" in FIGURE 1, the binary divider flip-flop 14 is triggered, and a phase reversal occurs in the output of 14. At the same time, the signal from the output of 6 operates the inhibition 8, 9, 10, which inhibits 6 and prevents the latter of automatically generating a new phase reversal when a new pulse is delivered by 2, before the respective conditions of 6 and 7 be determined by the next signal pair applied at E.

Conversely, in the case of an AZ pair, circuit 6 assumes its non-passing condition, while circuit 7 is brought to its passing condition. A pulse delivered by 2 is transmitted through connection "AZ" to the inputs of the "OR" circuits 10 and 11. The output of 11 triggers flip-flop 12 and causes in its output a phase reversal which corresponds to a $\pi/2$ radian phase shift in the output of the binary divider 14. The inhibition circuit 8, 9, 10 operates as formerly, to avoid a new pulse delivered by 2 to cause an undesired new phase shift in the output of 12, before new respective conditions of 6 and 7 be determined by the next signal pair applied at E.

The transmission of the pulses from the clock pulse source 1 through circuit 13 cannot be hampered by the operation of circuits 6 and 7, thanks to the above-mentioned non-coincidence phase condition between the pulses respectively delivered by 1 and 2.

Considering now the case of a ZA pair succeeding any pair, it will easily be seen from the examination of the succession order in which the control signals appear at points 101, 102 and 103, that neither of the "AND" circuits 6 and 7 may become conducting at any time within the duration of said ZA pair. If the preceding pair was a ZZ pair, circuits 6 and 7 were already closed and cannot be opened by the ZA pair; if, on the contrary, the preceding pair was an AA or an AZ pair, the inhibition release of 6 and 7 does not take place before the control signals at 101, 102, 103 assume the ZA arrangement which also closes 6 and 7. Consequently, no phase change occurs in the carrier wave until the prevailing conditions are changed upon the arrival of the first signal of the pair which immediately follows the ZA pair. The latter first signal then combines with the A of the ZA pair, to form a new AA or AZ pair, which is dealt with according to the above-explained rules for such pairs. Thereafter, the operation of the system continues with the new pair arrangement starting from the latter said AA or AZ pair as its initial pair.

The demodulation of the wave generated by the above-described modulator is achieved by applying the following rules:

(1) As long as no phase jump occurs, a Z value is displayed.

(2) When a phase jump of $\pi/2$ radians occurs, the sequence AZ is displayed.

(3) When a phase jump of $\pi$ radians occurs, the sequence AA is displayed.

The arrangement and operation of an example of embodiment of a demodulator in accordance with the invention will now be described with reference to FIGURES 2 and 3.

Figure 2:
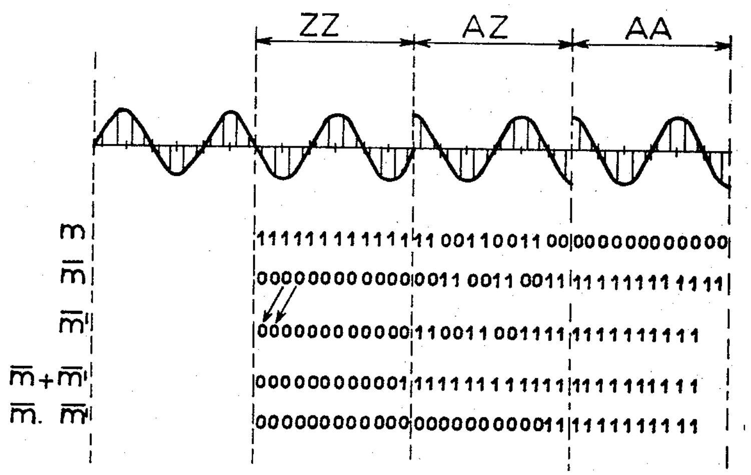
FIGURE 2 shows a curve and a tabulation of data illustrating the operation of a demodulator according to the invention.

FIGURE 2 shows the waveshape of the transmitted signal at terminal S in FIG. 1 and the results provided at the receiving end of the system by a demodulator according to the invention.

Figure 3:
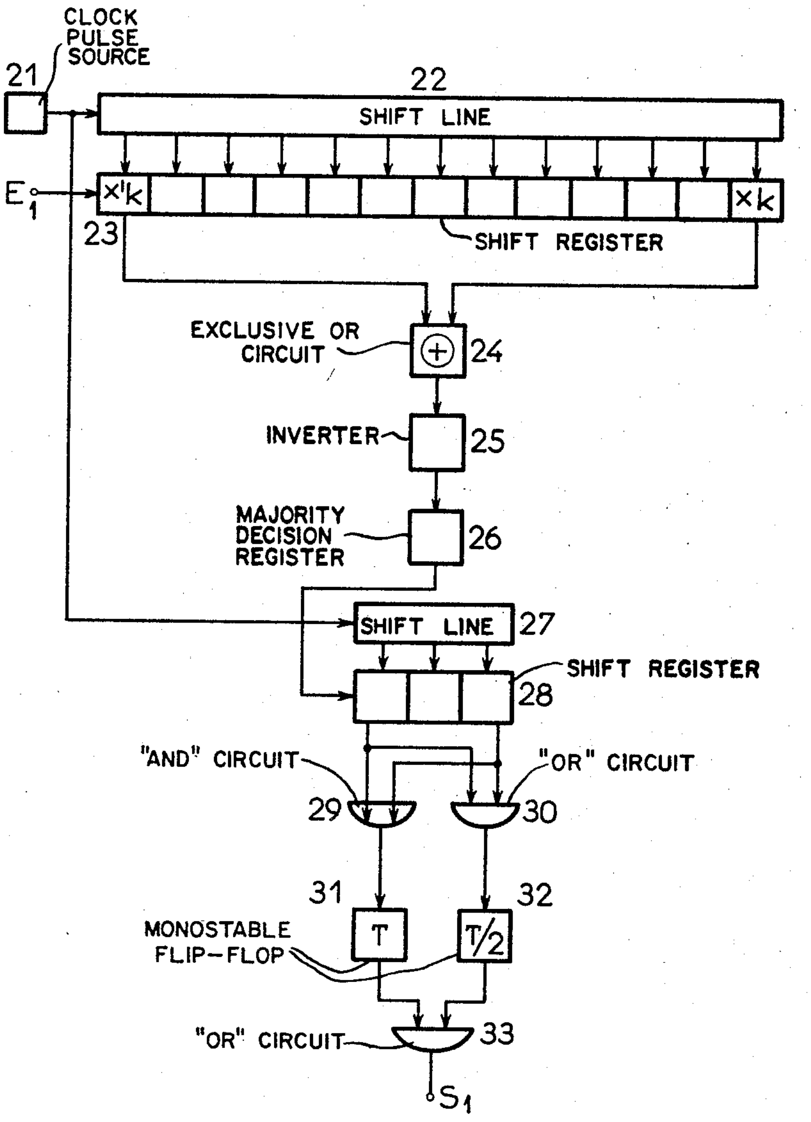
FIGURE 3 is a schematic diagram of an embodiment of a demodulator according to the invention.

FIGURE 3 shows an embodiment of a demodulator in which demodulation is effected by means of twelve polarity samplings of the received wave during the time duration T of an elementary signal pair.

The samples fed in $E_1$ in FIGURE 3 are received in a thirteen stage shift register 23, where they move under the effect of the pulses from the clock 21 applied through the shift line 22. The samples contained in the first and last stages, $x_k$ and $x'_k$, are fed into an "exclusive OR" circuit 24, which derives the quantity: $m=x_k+x'_k$, the addition sign being taken in the sense of Boolean algebra. The 1 and 0 values of $x_k$ or $x'_k$ are assumed to respectively correspond to a positive and a negative sample polarity.

The inverter 25 derives the complementary quantity $\overline{m}$ to $m$, which after passing through a majority decision register 26 to be described hereunder, is fed to the three-stage shift register 28 driven from 21 by the shift line 27. As shown by the arrows in FIGURE 2, the value of $\overline{m}'$ is equal to that of $\overline{m}$ taken with a time advance of two sampling intervals, corresponding to the time interval required for the shifting of a digit from the first to the third stage of register 28. From the quantities $\overline{m}$ and $\overline{m}'$, coming from the first and third stages respectively, the quantity $\overline{m}\,\overline{m}'$ is derived in the "AND" circuit 29, and the quantity $(\overline{m}+\overline{m}')$ in the "OR" circuit 30. The method by which the demodulated signals are derived from the logical values $\overline{m}$ and $\overline{m}'$ can easily be understood from the examination of FIGURE 2 and has been explained at full length in the already-mentioned copending application No. 454,048.

For the example of the sequence ZZAZAA, FIGURE 2 (in which Z is assumed to represent a 1-digit and A a 0-digit) shows in (a) a received phase modulated wave from which are taken, for demodulation purposes, twelve samples per signal pair of duration T. The corresponding values for $\overline{m}$, $\overline{m}'$, $\overline{m}+\overline{m}'$, $\overline{m}\,\overline{m}'$ are given thereunder.

Designating any given pair by UV, and setting a correspondence between the value Z and the values 0 of $(\overline{m}+\overline{m}')$ and of $\overline{m}\,\overline{m}'$, and between the value A and the values 1 of $(\overline{m}+\overline{m}')$ and of $\overline{m}\,\overline{m}'$, it is seen in FIGURE 2 that the following sequences are obtained:

Taking $U=\overline{m}+\overline{m}'$, the sequence ZAA and taking $V=\overline{m}$, $\overline{m}$, the sequence ZZA.

The addition of U and V, after delaying V by T/2, does give back the original sequence ZZAZAA.

The correctly restituted telegraph signals appear in their proper sequence at point $S_1$ in FIG. 3 past the "OR" circuit 33 to which is fed a square wave consisting of successive elements each having either of two values and each of duration T provided by the component 31, which itself is controlled by the quantity $(\overline{m}+\overline{m}')$ from 29 and/or a square wave consisting of successive elements each having either of two values and each of duration $T/2$ provided by the component 32 which itself is controlled by the quantity $\overline{m}\,\overline{m}'$ from 30; the components 31 and 32 may be monostable flip-flops.

The choice of a three-stage register for 28 is, of course, closely related to the fact that there are three-half waves of the carrier and twelve samplings in the duration T. This choice corresponds to a time interval equal to a quarter period of the carrier wave between quantities $\overline{m}$ and $\overline{m}'$. If the relationship of the carrier wave frequency to duration T and the number of samplings for the same duration were different, the number of stages of register 28 should be accordingly selected.

The demodulation process described above may lead to a small number of errors. Also, errors are unavoidable since the receiving clock and the transmitting clock are not strictly synchronized. Such errors are eliminated in the component 26, which is a majority decision register, described in the aforementioned U.S. patent application Ser. No. 454,048 filed on May 7, 1965, in the name of Jacques Oswald.

Should there be no phase distortion in the wave transmitted through a communication channel and received at the receiving end of the system and should the receiving end clock be strictly synchronized, one would obtain, for a given condition of the received wave, for instance that corresponding to $Z=1$, a uniform sequence "1" signals for all pairs of polarity samplings per elementary signal. But owing to the deficiencies mentioned above, one will obtain in fact a sequence containing, per signal, an average of $n$ signals comprising a majority of "1's," but also a few "0's."

By means of the majority decision register described in the above-referenced patent application these faults are eliminated by means of a logical circuit which performs a number of comparisons between several successive demodulated elements, in odd number, and which through a majority determination process, delivers a value corresponding to that of the majority of the elements.

By way of example, a sequence $m$ is given below corresponding to $Z=1$ which is assumed to contain four faults or zeros along with a sequence $m'$ obtained from the previous sequence $m$ through a majority decision process.

$m$  1 0 1 0 1 1 0 1 1 1 0 1
$m'$  1 0 1 1 1 1 1 1 1 1

In this process, the first three bits of the sequence $m$ (101) are compared; as the majority of these bits is 1, the digit 1 is introduced in the sequence $m'$. The next group of three bits (010) yields by majority decision a 0 and this digit is introduced in the sequence $m'$, etc. This same process may be applied again to eliminate all errors from the sequence.

In Boolean algebra, a majority decision process can be performed as follows:

If $m_1$, $m_2$, $m_3$ are three successive values derived from the sampling of the wave, the value $m'_2$ which is substituted by majority decision for the value $m_2$ is given by the equation:

$$m'_2=m_1m_2+m_2m_3+m_3m_1$$

In implementing these techniques by means of the majority decision register described in the above-referenced patent application, the elements or samples of the wave are fed into a three stage shift register, the shift line of which is controlled by the receiving end clock. The logical products two by two of the three quantities $m_1$, $m_2$ and $m_3$ in the shift register are performed by three "and" gate circuits in accordance with the above equation and the outputs of the "and" gates are applied to an "or" gate which delivers the quantity $m'$.

It is to be understood that the above-selected numerical values of the parameters are illustrative only. The embodiments of the invention more particularly described herein were given only as illustrative examples and should not be interpreted in a limiting sense.

We claim:

1. A differential phase modulator for modulating a carrier-wave by a time succession of binary signal pairs of constant duration T each consisting of a first and a second binary signal each having either of first and second possible signalling conditions and a duration substantially equal to $T/2$, comprising an input terminal for receiving said signal pairs and circuit means connected with said input terminal for storing the two elements of any given one of said signal pairs and for causing control voltages to appear at a plurality of points in said modulator, said voltages having values depending on the respective signalling conditions of said two elements, a clock pulse source delivering pulses at a frequency equal to an integer multiple of $2/T$, frquency divider means fed from said clock pulse source and delivering control and sampling pulses at a frequency equal to $2/T$, said circuit means being operated from said sampling pulses, a first "or" gate having first and second inputs and an output, a first binary divider flip-flop having an input and an output, a second "or" gate having first and second inputs and an output, and a second binary divider flip-flop having an input and an output; said first gate, first flip-flop, second gate and second flip-flop being connected in that order with the output of said first "or" gate connected to the input of said first flip-flop, the output of said first flip-flop connected to the first input of said second "or" gate, and the output of said second "or" gate connected to the input of said second flip-flop;

further circuit means for connecting the output of said second flip-flop to an output terminal for said modulated carrier wave;

connection means for impressing pulses from said clock pulse source on the second input of said first "or" gate;

first and second "and" gates each having three signal inputs and an output and an inhibition input;

means for impressing said control pulses on a first signal input of each of said "and" gates and for impressing one of said control voltages on a second signal input of both said "or" gates, and means for impressing two further ones of said control voltages respectively on the third signal input of one and the other of said "and" gates;

further connection means for respectively connecting the outputs of said "and" gates with said second inputs of said first and second "or" gates; and an inhibition circuited control from the outputs of both said "and" gates for impressing inhibition voltages on the inhibition inputs of both said "and" gates.

2. A modulator as claimed in claim 1, in which said circuit means include a first and second bistable flip-flop in cascade connection, said first bistable flip-flop having two inputs and two outputs and said second bistable flip-flop having two inputs and at least one output.

3. A modulator as claimed in claim 2, in which said input terminal is directly connected with one input terminal of latter said first bistable flip-flop and through an inverter to a second input terminal of same latter said first bistable flip-flop, the two outputs of which are respectively connected with the two inputs of latter said second bisable flip-flop, and in which said plurality of points includes the two outputs of latter said first bistable flip-flop and one output of latter said second bistable flip-flop.

4. A modulator as claimed in claim 1, in which said further circuit means include a bandpass filter.

5. A modulator as claimed in claim 1, in which said inhibition circuit consists of a further "or" gate and a monostable flip-flop in cascade connection, in which said further "or" gate has two inputs respectively connected with the outputs of said "and" gates, and in which the output of said monostable flip-flop is fed to the inhibition inputs of both said "and" gates.

6. A modulator as claimed in claim 5, in which the output of said monostable flip-flop is fed to the inhibition input of both said "and" gates through an inverter.

7. A demodulator for a differential phase-modulated wave modulated by phase jumps occurring at time intervals equal to integer multiples of a constant time interval $T/2$, said phase jumps having either of first and second different non-zero values according to the composition of time-successive binary signal pairs having a constant duration T and each consisting of first and second signals each having either of two possible signalling conditions and a duration substantially equal to $T/2$, said demodulator comprising means controlled from a clock pulse source for taking samples of the polarity of said wave at recurring instants separated by a constant time interval equal to a small fraction of T, a first shift register for storing a number of successive ones of said samples for a time at least equal to T, logic circuit means fed from successive pairs of said stored samples having their two elements taken at sampling instants separated by a time interval equal to T and delivering digit having either of the one and the zero values according to the relative polarity of the two elements of said pairs of samples, connection circuit means for feeding said digits to a second shift register and storing them therein, and further logic circuit means for combining the values of any two of said digits stored in said second register at instants separated by a time interval equal to a given integer multiple of said fraction; said further logic circuit means comprising logical addition means delivering the logical sum of said two digits and logical multiplication means deliverng the logical product of said two digits, and means for staggering in time said sum and product to reconstitute said binary signals.

8. A demodulator as claimed in claim 7, in which said further logic circuit means comprise an "or" gate and an "and" gate each provided with two inputs and an output, in which said two digits are respectively applied to one and the other of the inputs of both said "or" and "and" gates, in which the outputs of said gates respectively control the operation of a first and a second monostable flip-flop having respective time constants substantially equal to $T/2$ and T, and in which the outputs of said monostable flip-flops are respectively fed to the two inputs of a further "or" gate, the output of which delivers said reconstituted binary signals.

9. A demodulator as claimed in claim 7, in which said connection circuit means comprise majority decision means for recurrently comparing the values of an odd number of consecutive ones of said digits and for delivering as a result of said recurrent comparisons a sequence of corrected digits which are fed to said second shift register.

References Cited

UNITED STATES PATENTS

| | | | |
|---|---|---|---|
| 3,128,343 | 4/1964 | Baker | 178—66 X |
| 3,330,909 | 7/1967 | Willson | 325—30 X |

ROBERT L. GRIFFIN, *Primary Examiner.*

J. T. STRATMAN, *Assistant Examiner.*